Nov. 17, 1931. C. BRUCK 1,832,358
SELF CLEANING RAKE
Filed Nov. 18, 1929
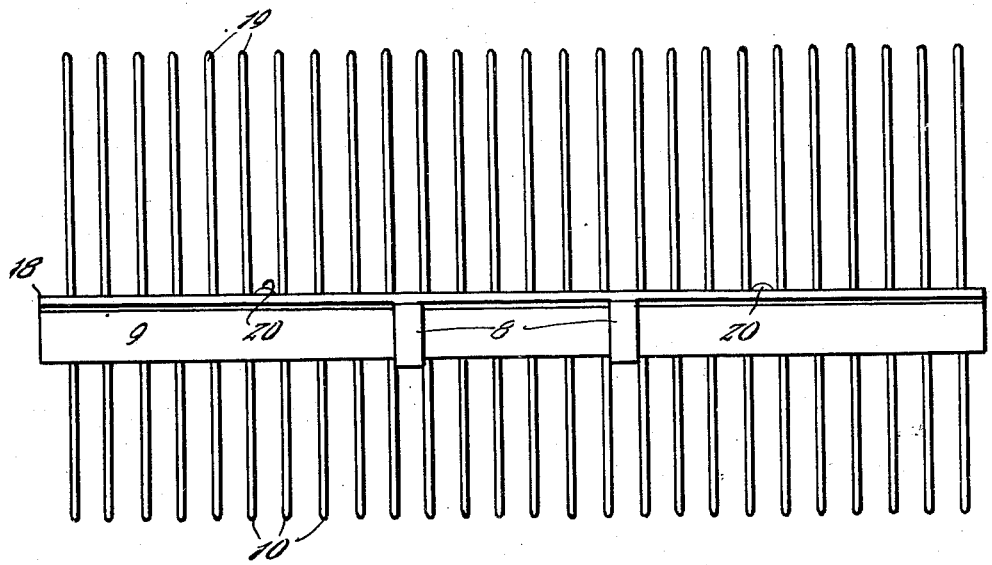
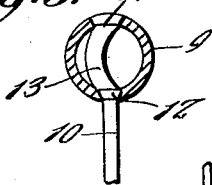
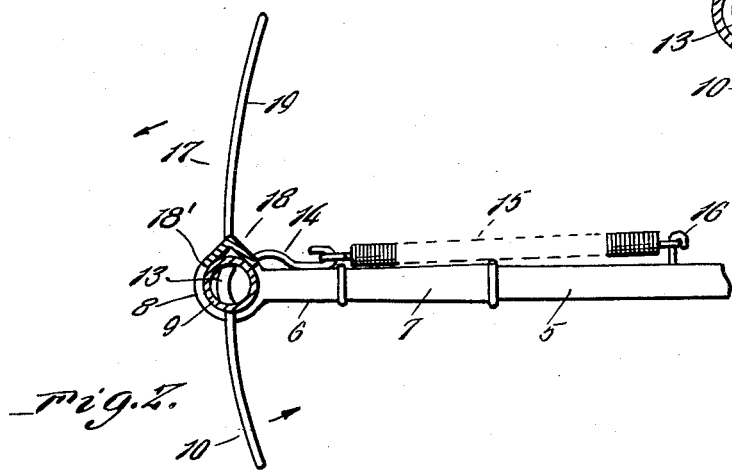
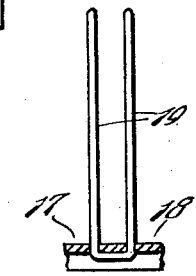
Inventor
Charles Bruck
By Clarence A. O'Brien
Attorney Patented Nov. 17, 1931

1,832,358

UNITED STATES PATENT OFFICE

CHARLES BRUCK, OF BELOIT, WISCONSIN

SELF CLEANING RAKE

Application filed November 18, 1929. Serial No. 408,032.

This invention relates broadly to rakes and has as its primary object the provision of a rake that is positively self-cleaning, easy to operate, firmly made, thus rendering the rake durable, and capable of being used either where the amount to be raked is heavy or light and with equally good results.

Another very important object of the invention is to provide a self-cleaning rake including means for folding the teeth of the rake in a positive position, and at the same time to provide means in connection therewith for returning the rake teeth to their normal position when the rake tooth carrying boss has been rotated for cleaning the teeth of the rake, and wherein the returning of the rake teeth to their normal position will require little or no exertion on the part of the operation.

A still further important object of the invention is to provide a self-cleaning rake of the character above mentioned having guard means formed thereon to prevent raking from falling back over over the rake upon the ground which has been previously raked.

Other objects and advantages of the invention will become apparent during a study of the following description, taken in connection with the accompanying drawings, wherein:—

Figure 1 is a front elevation of a rake embodying the features of the present invention.

Figure 2 is a transverse sectional view taken through the rake teeth carrying bar.

Figure 3 is a fragmentary detail sectional view for more clearly showing the manner of securing the rake teeth to the rake carrying bar.

Figure 4 is a fragmentary detail sectional view of the guard member.

With reference more in detail to the drawings, it will be seen that my improved rake comprises a handle 5 which is connected to the yoke designated generally by the reference character 6. The yoke 6 comprises a socket 7 for receiving one end of the handle 5, and the socket 7 merges into a fork the legs of which at their outer free ends have formed integrally therewith transversely aligned sleeves or eyes 8. A tooth carrying bar 9 which bar 9 is preferably of elongated tubular construction extends through the sleeves 8 and has its intermediate portion rotatably supported in said sleeves. The work teeth of the rake are designated generally by the reference character 10 and each of the teeth 10 are transversely curved the upper ends of the teeth extending transversly through the tooth carrying bar 9, the upper ends of the teeth terminating flush with the top of the bar 9. At said upper ends, the teeth 10 are provided with rounded heads 11 roughened and driven into round holes in the tooth bar 9. Inwardly from their upper ends, the teeth 10 are likewise rounded and roughened as at 12 to snugly fit within openings in the bottom of the bar 9. The portions of the teeth 10 within the tubular tooth carrying bar 9 are flat as at 13, the flat portion 13 being curved longitudinally and aids in more firmly securing the teeth 10 to the bar 9.

The bar 9 intermediate the sleeves 8 has formed integrally therewith a lateral hook 14, the free end of which hook is adapted to abut the yoke 6 acting as a stop to limit the rotation of the bar 9 in one direction. To normally urge the hook 14 in abutting relation with the yoke, there is provided a coil spring 15 having one end thereof engaging with the hook 14 and the other end engaging with a hook 16 carried by the lower end portion of the handle 5. Thus the spring 15 acting upon the hook 14 will tend to normally hold the teeth 10 in working position, the hook 14 abutting the yoke when the rake is being drawn toward the operator when raking the material. When the rake is moved forwardly, as for another stroke, the resistance offered by the ground will overcome the tension of the spring 15 causing the teeth to swing rearwardly in the direction indicated by the arrows in Figure 2 whereby they may discharge all such raking as has accumulated thereon. As soon as the operator moves the teeth 10 out of contact with the ground the teeth 10 will return to their normal working position under the action of the spring 15, and the rotation of the bar 9 will be limited by the hooks 14 as is obvious.

To prevent the raking from falling over and behind the rake on to the ground which has been previously raked I provide a suitable guard designated generally by the reference character 17. This guard 17 comprises an elongated bar 18 preferably in the nature of an angle bar and extends along the top of the tubular bar 9 for the full length of said bar. The bar 18 is disposed on the tube 9 in such a manner as to straddle the tube 9 as shown to advantage in Figure 2. Guard fingers are formed from a plurality of U-shaped member 19 which extend transversely through the bar 18 at the apex portion of the flanges of said angle bar 18. The legs of the U-shaped members 19 are curved longitudinally to extend upwardly and rearwardly from said bar 18. The bar 18 is anchored or secured to the tubular tooth carrying bar 9 through the medium of bolts, rivets or other suitable fastening elements designated as at 20, so that when the tooth carrying bar 9 is rotated said bar 18 will move therewith in the direction of rotation, and the legs 19 of the respective U-shaped members form as it were continuation of the work teeth 10, being arranged in vertical alignment with respect thereto as shown to advantage in Figures 1 and 2. Manifestly, any of the rakings which would otherwise fall over and in back of the teeth 10 will be obstructed through the medium of the U-shaped members 19 and, of course, some of the rakings may cling to the legs of said U-shaped members. In that event when the operator moves forwardly the rake so as to bring the teeth 10 in contact with the ground to offer resistance to the teeth so that the teeth 10 swing inwardly in that direction in Figure 2 for cleaning the same, the U-shaped members 19 will move in that direction also indicated by the arrows in Figure 2 so that a cleaning of the U-shaped members 19 will also be affected simultaneously with the cleaning of the teeth 10. Further, the bar 18 being secured to the tubular tooth carrying bar 9, said U-shaped members 19 will be moved to the normal guard position under action of the spring 15 when resistance is no longer offered to the teeth 10. Of course, it is to be understood that the bar 8, at the edges of the flanges thereof will be suitably notched to accommodate the eyes or sleeves 8—8 as suggested at 18' in Figure 2.

It is believed that from the foregoing description, taken in connection with the accompanying drawings, a clear understanding of the operation, construction, utility and advantages of a self-cleaning rake of this nature will be had without a more detailed description.

Having thus described my invention, what I wish to claim as new is:—

1. A rake embodying a handle, a teeth supporting bar rotatably supported at one end of said handle, longitudinally curved teeth carried by said bar, a stop member carried by said bar and arranged thereon to engage said one end of the handle for limiting the rotation of said bar in one direction, spring means for normally urging said stop member into engagement with said handle, and a guard member detachably secured to said bar and including longitudinally spaced U-shaped members curving upwardly and rearwardly from the top of said bar.

2. A rake embodying a handle, a yoke on one end of said handle, said yoke at its free end having a pair of transversely aligned sleeves formed thereon, a tooth carrying bar rotatably mounted in the sleeves, longitudinally curved teeth carried by said bar, a hook carried by said bar and arranged thereon to engage with said yoke for limiting the rotation of said bar in one direction, a second hook carried by said handle, a spring secured at its opposite end to said hooks for normally urging said first mentioned hook into engagement with said yoke, and a guard member mounted on said bar for rotation with said bar.

3. A rake embodying a handle, a yoke on one end of said handle, a tooth carrying bar rotatably mounted on said yoke, an elongated bar rigidly mounted on the top of said tooth carrying bar for rotation therewith, a plurality of U-shaped guard members mounted on said second bar and curving upwardly and rearwardly therefrom.

4. A rake embodying a handle, a yoke on one end of said handle, a tooth carrying bar rotatably mounted on said yoke, an elongated bar rigidly mounted on the top of said tooth carrying bar for rotation therewith, a plurality of U-shaped guard members mounted on said second bar and curving upwardly and rearwardly therefrom, a stop member carried by said tooth carrying bar for engagement with said yoke to limit rotation of the tooth carrying bar in one direction, and spring means yieldingly urging said stop member in engagement with said yoke.

In testimony whereof I affix my signature.

CHARLES BRUCK.